E. WAGNER.
Cotton Planter.

No. 108,947.

Patented Nov. 1, 1870.

Witnesses:
Harry King

Inventor:
Elijah Wagner
per Alexander & Mason
Atty.

United States Patent Office.

ELIJAH WAGNER, OF WESTMINSTER, MARYLAND.

Letters Patent No. 108,947, dated November 1, 1870; antedated October 22, 1870.

IMPROVEMENT IN COTTON AND CORN-PLANTERS.

The Schedule referred to in these Letters Patent and making part of the same.

*To all whom it may concern:*

Be it known that I, ELIJAH WAGNER, of Westminster, in the county of Carroll and in the State of Maryland, have invented certain new and useful Improvements in Cotton and Corn-Planter and Fertilizer-Distributer; and do hereby declare that the following is a full, clear, and exact description thereof, reference being had to the accompanying drawing and to the letters of reference marked thereon making a part of this specification.

The nature of my invention consists in the construction and arrangement of a "cotton and corn-planter with fertilizer-distributer," whereby the fertilizer will be deposited underneath the seed, the seed, however, not coming in immediate contact with the fertilizer, but having earth interposed between them, as will be hereinafter fully set forth.

In order to enable others skilled in the art to which my invention appertains to make and use the same, I will now proceed to describe its construction and operation, referring to the annexed drawing, in which—

A represents the frame of my machine, in which, upon a suitable shaft, B, is mounted a wheel, C, said wheel consisting merely of a rim having a conical case, D, attached to each side, and, the shaft B passing through the heads or ends of said cases, the wheel is firmly secured thereto.

From the frame A the shafts E E extend forward a suitable distance.

In front of the wheel C, upon two cross-bars in the frame A, is placed a platform, G, which supports the fertilizer-hopper H, said hopper being provided with legs secured to the platform upon which it rests.

In the bottom of the hopper is an opening for the passage of the fertilizer, and in suitable guides above said aperture is placed a slotted slide, *a*, moved back and forth from the outside of the hopper, by means of which the aperture for the passage of the fertilizer is made larger or smaller, at will, so as to distribute any amount desired.

Through the hopper H is passed a shaft, I, provided with arms *b b*, which, when the shaft revolves, agitate the fertilizer and prevent it from clogging.

At one end of the shaft I, outside of the hopper, is a pulley, *d*, connected, by means of a belt or chain, *e*, with a pulley, *f*, on the shaft B, so that the required rotary motion may be communicated to the shaft I.

In the center of the platform G, directly beneath the aperture in the bottom of the hopper H, is a funnel, *g*, into which the fertilizer falls, and is conducted, by means of a flexible pipe, *h*, attached to its lower end, to the boot J, from whence it falls into the furrow made by the plow K attached to the lower end thereof.

The boot J is pivoted between the rear ends of two braces or bars, L L, the front ends of which are pivoted to the shafts E E, and adjusted at any angle desired by means of the curved bar M, which passes up between the two braces, L L, and held by a pin above the same.

Figure 1:
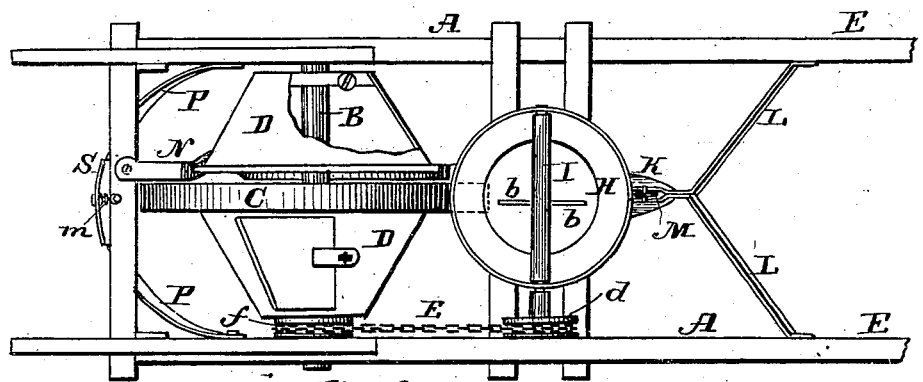
Figure 1 is a plan view of my machine, partly in section.
Figure 2:
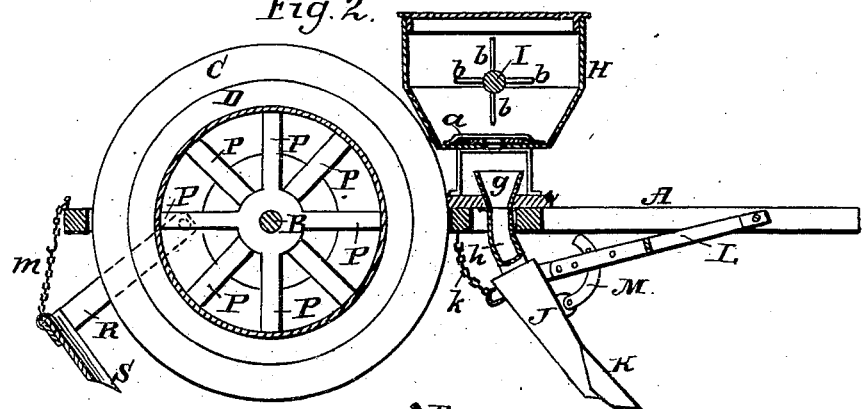
Figure 2 is a longitudinal vertical section of the same.
Figure 3:
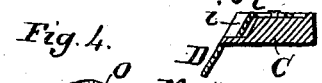
Figure 3 is a section of that portion of the wheel through which the seed is allowed to pass out.
Figure 4:
Figure 4 is a side view of a portion of the guide which retains the seed until the desired point where it is intended to allow the same to fall to the ground.

The boot J is further suspended from the rear side by means of a chain, *k*, as shown in fig. 2.

The wheel or rim C is on one side, at regular intervals, provided with recesses *i i*, having an adjustable slide, *l*, to regulate the amount of seed to be dropped.

Close to the same side of the rim C, and under the case D, on that side, is placed a curved bar, N, having an opening, O, in rear of and below the center of the wheel. This bar acts as a guide to confine or hold the seed contained in the recesses *i i*, so that the seed will not drop into the ground until after the rim or wheel C has covered up the fertilizer distributed in the furrow.

The seed or corn contained in the cases D is agitated by a number of arms, P P, radiating from the shaft B. These arms are made of sheet metal, and are very valuable, especially in the case of cotton-seed, which are very apt to stick together and clog up.

In rear of the wheel C, in the sides of the frame A, is pivoted a curved bar, R, to the center of which is attached the covering-plow S. This bar and plow is adjusted at any height desired by means of the chain *m* suspended from the rear of the frame A.

It will be seen from the above description of my machine that a furrow is first made in the ground, in which furrow the fertilizer is distributed. The earth thrown up by the plow K has a chance to fall back and cover the fertilizer before the wheel or rim C reaches it, when said wheel, so to say, packs a small quantity of earth on top of the fertilizer before the seed is dropped, and the seed is then covered up by the plow S. The object of this is that the seed shall not come in immediate contact with the fertilizer, which would have a tendency to destroy the seed instead of benefiting it.

Having thus fully described my invention,

What I claim as new, and desire to secure by Letters Patent, is—

1. A cotton or corn-planter, with fertilizer-distributer, so constructed that the fertilizer is first deposited and covered up, and then the seed or corn dropped and covered up, substantially as and for the purposes herein set forth.

2. The curved guide N, provided with opening O, constructed as described, and operating substantially as and for the purposes herein set forth.

3. The curved bar R, with covering-plow S, adjusted by means of the chain m, substantially as shown and described.

4. The combination of the fertilizer-hopper H, boot J, and plow K, with the seed-casing C D D, guide N, and covering-plow S, all constructed and arranged as described, to operate substantially in the manner and for the purposes herein set forth.

In testimony that I claim the foregoing, I have hereunto set my hand this 21st day of January, 1870.

ELIJAH WAGNER.

Witnesses:
  C. L. EMIL,
  A. N. MARR.